United States Patent [19]

Baer

[11] Patent Number: 5,672,272
[45] Date of Patent: Sep. 30, 1997

[54] UNITARY PLASTIC FILTER PLATE INCLUDING EXPANDABLE SKINS AND PLASTIC FOAM CORE

[76] Inventor: William F. Baer, 1509 N. Darsey St., Simi Valley, Calif. 91065

[21] Appl. No.: 440,104

[22] Filed: May 12, 1995

[51] Int. Cl.$^6$ ............................................. B01D 25/133
[52] U.S. Cl. ........................... 210/231; 210/350; 100/211
[58] Field of Search ............................ 210/231, 229, 210/350; 100/211; 5/450, 452

[56] References Cited

U.S. PATENT DOCUMENTS

| | | | |
|---|---|---|---|
| 3,362,032 | 1/1968 | Summers | 5/450 |
| 4,781,829 | 11/1988 | Stanik | 210/231 |
| 5,210,892 | 5/1993 | Johenning et al. | 5/450 |
| 5,452,487 | 9/1995 | Leggett | 5/450 |

FOREIGN PATENT DOCUMENTS

| | | | |
|---|---|---|---|
| 2709676 | 9/1977 | Germany | 210/231 |
| 56-95311 | 8/1981 | Japan | |
| 1569295 | 6/1980 | United Kingdom | |

*Primary Examiner*—Matthew O. Savage

[57] ABSTRACT

A filter plate which is formed in a molding operation and comprises an outer frame with integrally formed, relatively thin chamber forming walls or skins and which has an injected foam interior core. The filter plate is substantially constructed of plastic materials which are capable of being molded and thereby provides excellent heat transfer characteristics to the slurry which is being separated through the filter plate. The plate is capable of being expanded, much in the same manner as a diaphragm plate in order to improve separation characteristics, but provides excellent heat transfer characteristics and avoids the attendant disadvantages of a conventional diaphragm plate. An accessory in the nature of a filter screen having a unique construction and a method of making a unique filter screen is also disclosed.

3 Claims, 4 Drawing Sheets

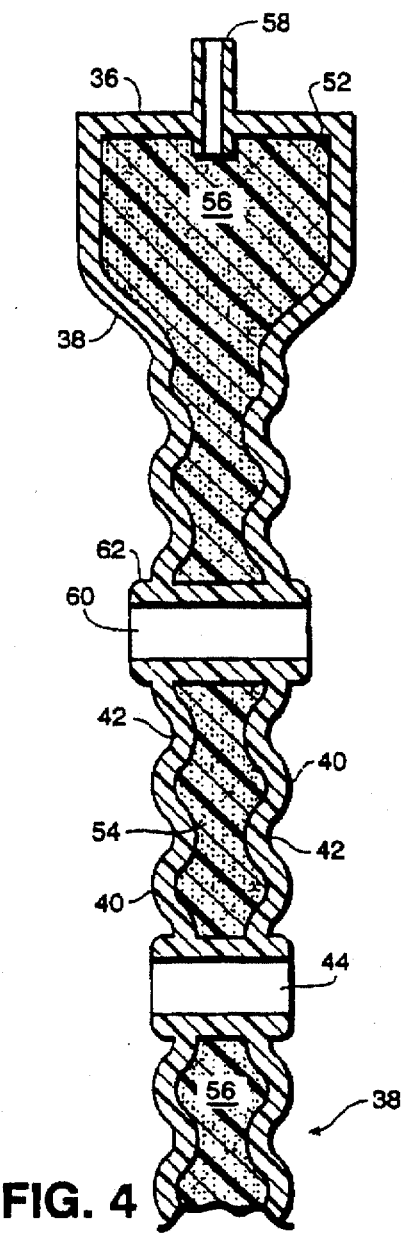
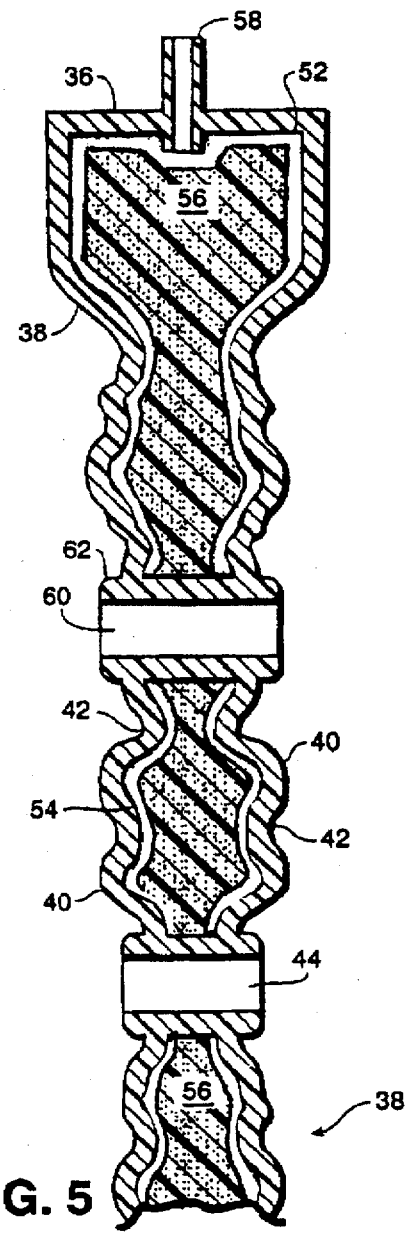
FIG. 4  FIG. 5
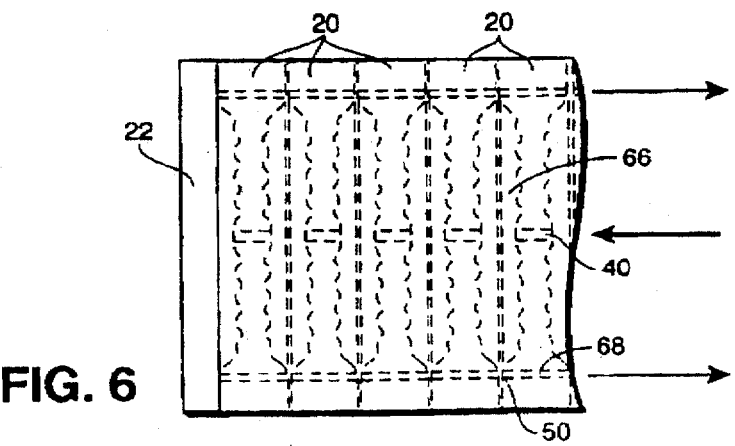
FIG. 6

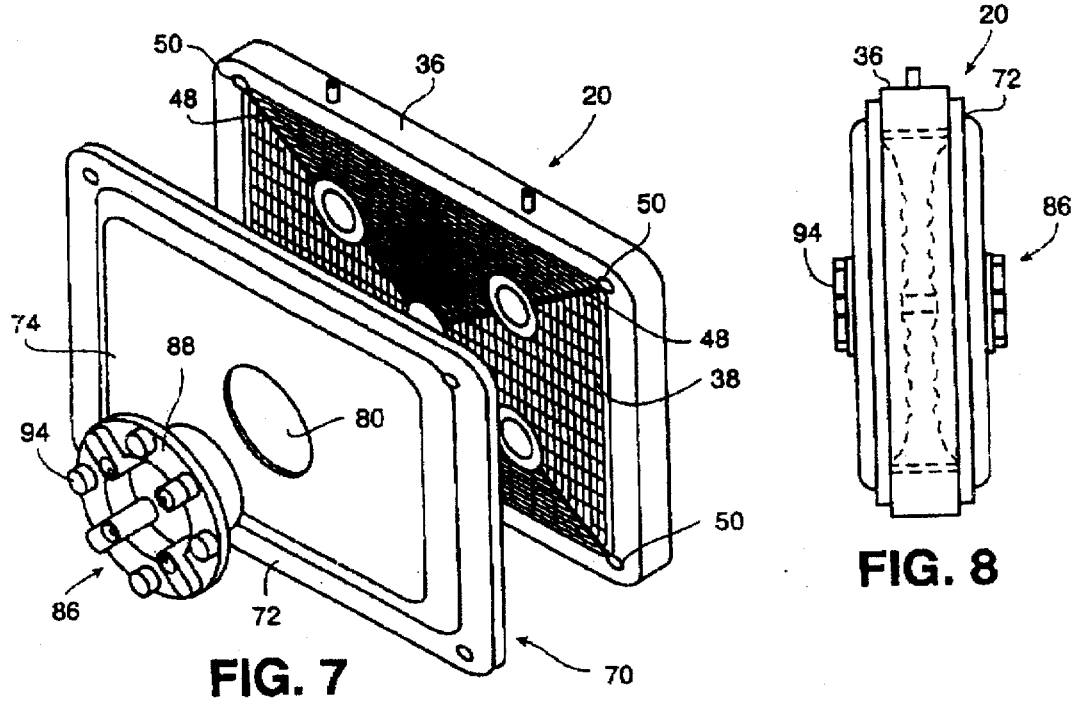
FIG. 7
FIG. 8
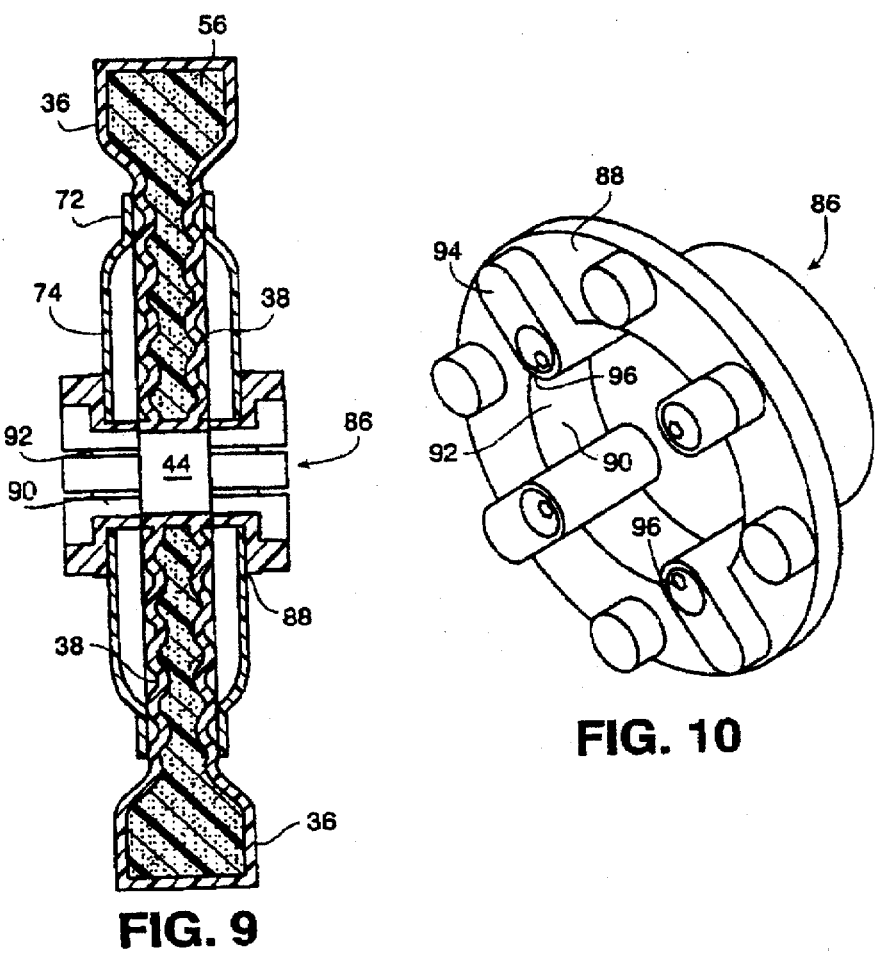
FIG. 9
FIG. 10

UNITARY PLASTIC FILTER PLATE INCLUDING EXPANDABLE SKINS AND PLASTIC FOAM CORE

BACKGROUND OF THE INVENTION

1. Field of the Invention

This invention relates in general to certain new and useful improvements in filter plates of the type used in filter presses, and more particularly, to a filter plate which is constructed of a frame and integral expandable plate forming walls or skins with an interior core capable of being expanded upon the introduction of an expanding fluid therein and which also provides excellent heat transfer characteristics, as well as accessories for such plates.

2. Brief Description of Related Art

Liquid-solid separation has, for many years, been an integral part of processes in many industries and primarily the chemical industry where it is often necessary to separate liquids from solids for purposes of reclaiming either the solids or the liquids, or both. Liquid-solid separation is also involved in numerous other industries as, for example, the food industry where the edible food product is oftentimes recovered from a liquid-containing slurry, and waste management where it is necessary to dispose of the solid waste material and possibly reclaim or recycle the liquid.

One of the principal devices for causing liquid-solid separation is a filter press and these filter presses conventionally use a plurality of marginally registered stacked filter plates. Each of the filter plates comprise a plate structure having a filter membrane or so-called "screen" disposed across the plate. The filter plates are held in tight engagement with one another in a stacked arrangement to enable the liquid to be passed through the filter or screen and allowing the solid or solids to form on the screen as a cake.

Numerous filter plate designs are available in the prior art. Each of these filter plates have a main peripheral frame with a central plate structure extending across the frame. A separate filter or screen is placed on each of the sides of the frame. The liquid slurry containing the solid is then pumped through the filter plates and brought into contact with the screens, usually under pressure. The solid material in the slurry forms as a cake on the exterior sides of the screens allowing the liquid to pass through the screens and into a duct network connected to the filter plates and delivered to a collection area.

One of the major drawbacks of the type of filter plates heretofore described is that in the absence of some type of plate expansion, the water extraction process is relatively slow. Thus, separation of liquid from water, depending upon the type of materials involved, can take many hours. This necessarily slows down an entire process or otherwise, requires the provision of a large number of filter presses.

Each of the conventional filter plates usually employ a filter screen having a pair of filter sheets or so-called "screens" with one on each of the opposite sides of the plate. The filter plate is provided with a central feed opening and the screen, which is usually in the form of a fabric gauze material, is stuffed through the hole so that the sheet can open on each of the opposite sides of the plate. However, this construction necessarily limits the plate to a single screen and furthermore, to a single feed duct.

There have also been many commercially available diaphragm plates which are available in the prior art. These diaphragm plates are typically constructed of a relatively rigid frame member, such as a rectangular frame, and have elastomer sheets connected to each of the sides of the frame on the exterior thereof in order to form a type of plate structure. The elastomer sheets are expandable outwardly so that when a fluid is introduced into the plate, a pressure will build up behind the elastomer sheets causing the elastomer sheets to expand.

In the conventional filter press, a pair of plates lie in Juxtaposed arrangement with respect to one another and hence, the screens on those plates lie in juxtaposed arrangement. The slurry is introduced into the cavity between the two screens and when the elastomer sheets expand against the slurry captured between two plates this forces a greater separation of the liquid-solid slurry.

These diaphragm plates have several disadvantages. First of all, the diaphragm plate has little heat transfer capability. Consequently, it is difficult, if not virtually impossible, to control the temperature of the slurry which may be desirable, if not absolutely necessary in many chemical process operations. Equally disadvantageous is the fact that the elastomer membrane is secured within a groove formed in the interior of the frame. However, this structure is not capable of withstanding any significant pressure if the diaphragm plate is inadvertently expanded when not in the confines of a press. Consequently, the elastomer will literally blow out of the frame itself, thereby totally destroying the frame.

If several frames are located in a press and adequate pressure is not applied to the frames before an expansion process begins, then several plates could all simultaneously be destroyed. These plates are quite expensive and therefore, destruction of the plates can be cost prohibitive and materially add to the overall cost of the process.

There has been a need for a filter plate which provides excellent heat transfer characteristics and does not suffer the problems of a potentially rupturing diaphragm and which still maintains excellent structural integrity with expansion characteristics. There has also been a need for a filter plate having a screen which can be easily replaced and which can be readily reused.

OBJECTS OF THE INVENTION

Some of the major objectives of this present invention are to therefore overcome many of the problems inherent in prior art filter plates and in prior art filter screens used in connection with filter plates, as well as to overcome other problems associated therewith.

It is therefore one of the primary objects of the present invention to provide a filter plate construction which has excellent structural integrity and which is capable of having plate or skin expansion and contraction to aid in liquid-solid separation.

It is another object of the present invention to provide a filter plate construction of the type stated which has excellent heat transfer characteristics and enables temperature control of a slurry during a separation operation.

It is a further object of the present invention to provide a filter plate construction of the type stated which has a plurality of feed inlets thereby improving the overall efficiency of operation of the filter plate.

It is an additional object of the present invention to provide a filter plate construction which can be easily and inexpensively made in a rotational molding operation.

It is also an object of the present invention to provide a filter plate construction of the type stated which can be manufactured at a relatively low cost, but which is highly efficient in operation and has excellent longevity.

It is another salient object of the present invention to provide a filter plate construction in which a pair of separate screens can be clamped to each of the opposite sides thereof.

It is still another object of the present invention to provide a filter screen which can be made as a relatively unitary structure and which does not suffer layer delamination extant in many prior art filter screens.

It is yet a further object of the present invention to provide a unique method of making a filter screen in a single molding operation.

It is still an additional object of the present invention to provide a method of separating a solid and liquid from a slurry in a filter operation while maintaining excellent heat transfer characteristics.

With the above and other objects in view, my invention resides in the novel features of form, construction, arrangement and combination of parts presently described and pointed out in the claims.

BRIEF SUMMARY OF THE INVENTION

The present invention relates in general to filter plates and filters used therewith, typically in filter press arrangements. The present invention provides, in a preferred aspect, several embodiments of a unique filter plate construction, as well as a unique filter, or so-called "filter screen", used therewith.

The filter plate of the present invention is used in filter presses to affect liquid-solid separation. The filter plate is constructed so as to allow expansion in order to facilitate liquid-solid separation. The filter screen of the invention becomes an important part of the assembly with that filter plate.

The filter plate comprises a main peripherally extending continuous frame having a hollow interior and which is preferably plastic molded and even more preferably rotationally molded. The frame would normally be opened in a central portion, but is provided with a pair of spaced-apart plastic skins which extend entirely across the opened portion of the frame and form an interior space therebetween. This interior space is in communication with the interior of the frame.

A solid core foam material is introduced into and substantially fills the space between the pair of skins and also the central hollow interior of the peripherally extending frame. It has been found in connection with the present invention that the foam core does not laminate to the skins. This permits expansion of the skins when a fluid is introduced into the hollow interior of the frame and the space located between the skins. The introduction of an expanding fluid imposes an additional pressure against the slurry and facilitates liquid-solid separation. In this respect, a fitting may be literally molded into the frame during the formation of the frame to enable introduction of the fluid into the hollow interior of the frame and the space between the skins. In like manner, other fittings, such as liquid drainage fittings and the like, may also be molded directly in to the skins or the frame, or both.

In a preferred embodiment, the skins in the filter plate are preferably integral with the frame and become integral during the holding operation, such as the rotational molding operation. Moreover, the skins have a type of convoluted surface construction which facilitates the expanding of the skins. Thus, the skins have an excess material taken up by ridges and valleys between the ridges in a type of accordion process which permits expansion as the skins are forced outwardly under an expanding fluid. Further, the skins are provided with additional liquid drainage channels formed with the convolutions and on the outer surface of the skins to permit liquid drainage.

In another embodiment of the invention, the filter plate assembly is provided with an improved means for mounting a filter thereto. The filter plate is again provided with a continuous peripheral frame having at least one skin, and preferably a pair of skins, extending across the open portion of the frame. A filter is located against the skin and receives a slurry on the exterior face thereof. When the filter plate is locked into a position with a plurality of other filter plates on each of the opposite sides thereof, a cavity is formed between the filter screens of a pair of adjacent filter plates. A feed slurry is introduced through a feed aperture in the filter plate into the individual cavities. Liquid separation occurs by passage of the liquid through the filter screen and permits drainage of the liquid leaving the formation of the solid as a cake on the exterior face of the screens.

The filter screen of this invention is provided with a frame having a central opening and a filter material, such as a filter screen, extending across this opening and lying in juxtaposition to the skin of the frame. The filter material also has an aperture alignable with a main aperture in the skin.

A retaining adapter is provided with the filter plate for holding the filter screen to the filter plate and then three components constitute a filter plate assembly. This retaining adapter is provided with a hub, such as a cylindrically-shaped hub, extendable through the apertures in the filter plate and in the skin. An enlarged flange is secured to and extends around an end of the hub. This flange engages the filter material and holds the filter onto the filter plate. Means can be further provided for releasibly holding the filter to the filter plate as, for example, fasteners and the like.

In a more preferred embodiment, the filter plate assembly has a pair of skins which extend across the opposite sides of the frame, as aforesaid. The second skin is also provided with a central aperture and which is alignable with a like central aperture in a second filter. Further, a second retaining adapter, substantially identical in construction to the first named retaining adapter, is provided for holding the second filter against the second skin of the filter plate.

In a more preferred embodiment, the retaining adapters used with the assembly of the invention, are provided with central ducts which carry the slurry to a side of the filter away from the skin to which the filter is juxtaposed. Thus, the feed slurry is introduced through the apertures of each of the aligned filters and filter plates and the liquid is drained away by means of drainage channels in the filter plate connected to drainage tubes or drainage ducts.

In a more preferred embodiment of the invention, the filter plate is provided with a plurality of feed apertures in the plate in order to receive the feed slurry simultaneously at different points on the plate. A separate filter is secured to the plate at each of these feed apertures. These filters, in combination, cover substantially all of the surface area of the skins of the filter plate. Moreover, each of these filters are mounted to the plate in the same manner as previously described. This construction enables a plurality of feed ducts to be provided to each individual filter, since it is now possible to avoid the type of sewn filter which must be inserted through a feed opening and then opened on each of the opposite sides thereof.

In another embodiment of the invention, an improved filter screen device of the type used with filter plates in a filter press is also provided. This filter screen device comprises a filter medium which may be in the form of a cloth or screen and has a porosity sufficient to allow liquid of a slurry to pass therethrough and collect a solid of that slurry on the surface of the filter medium. An outer peripheral surrounding rim formed of an elastomer material is secured to the filter medium. In this case, the filter medium, such as the screen, is molded into the rim in order to form a unitary structure.

In a preferred embodiment, the screen is formed of a non-elastomeric material. The screen is located in the central opening of the rim and the screen has an outer peripheral edge located at and molded into the inner peripheral edge of flanges on said rim extending into the opening. In this way, the screen truly becomes an integral structure with the surrounding elastomeric material.

The screen is also provided with an aperture extending therethrough in order to receive a retaining adapter of the type previously described. This retaining adapter is effective to mount the filter screen apparatus to the filter plate.

The present invention also provides a method of separating a solid and a liquid from a slurry in a filter press comprised of individual filter plates. The method comprises locating a filter screen against a skin of a filter plate having a surrounding peripheral frame and a skin extending across the frame. The method further involves the aligning of an aperture in the filter screen with a like alignable aperture in the skin of the filter plate. Thereafter, a hub forming part of a retaining adapter is inserted into aligned apertures in the filter screen and the filter plate. Thereafter, the retaining adapter is effectively clamped to the screen and to the plate.

This invention possesses many other advantages and has other purposes which will be made more fully apparent from a consideration of the forms in which it may be embodied. Some of the forms of the filter plate, and the accessories, and for that matter, the associated methods, is more fully described in the following description, and more fully illustrated in the accompanying drawings. However, it is to be understood that these drawings and the following detailed description are, set forth for purposes of illustrating and describing the general principles of the invention and are not to be taken in a limiting sense.

BRIEF DESCRIPTION OF THE DRAWINGS

Figure 1:
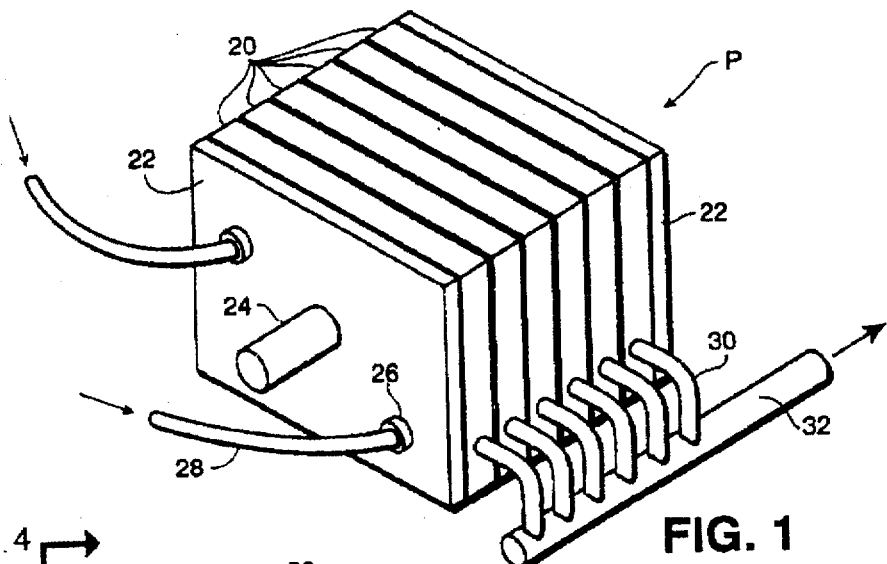
Figure 2:
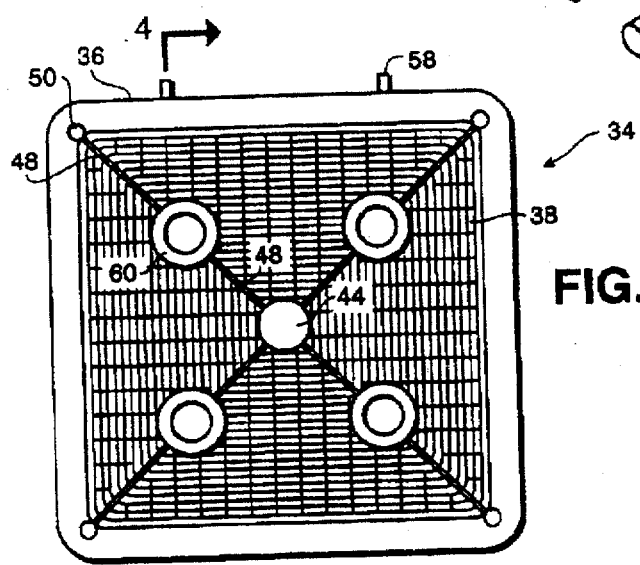
Figure 3:
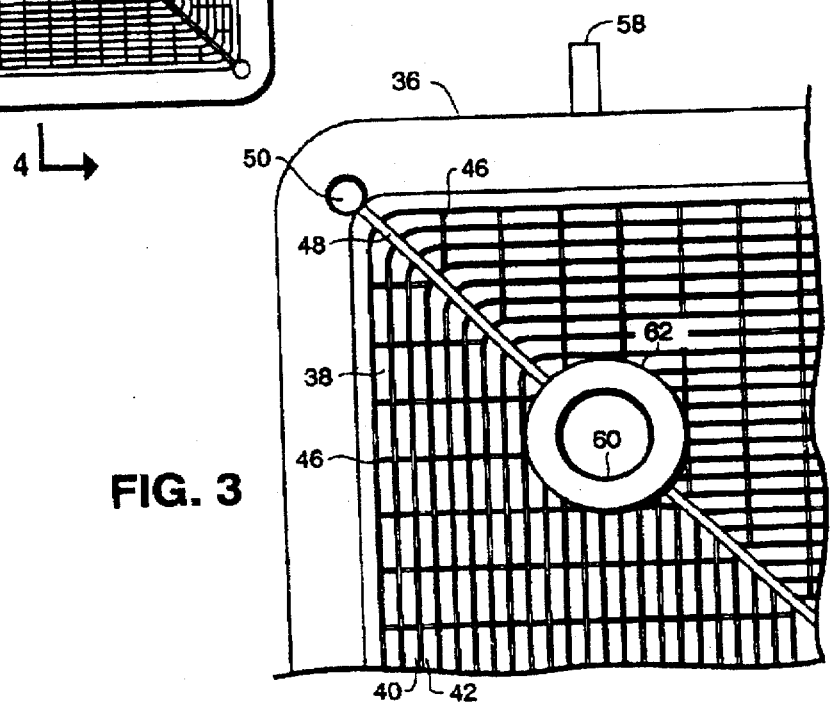
Figure 11:
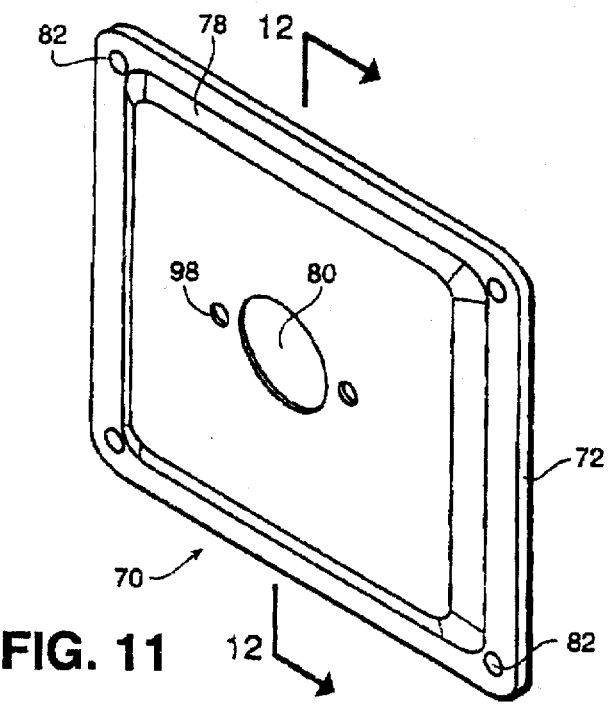
Figure 12:
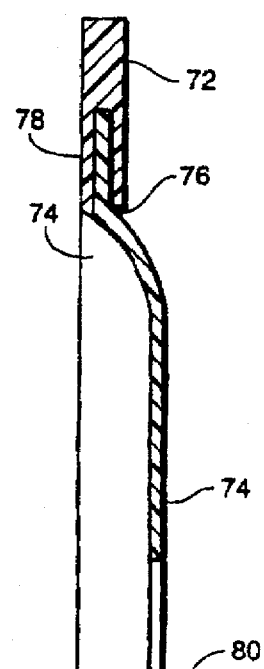

Having thus described my invention, reference will now be made to the accompanying drawings in which:

FIG. 1 is a perspective view of a plurality of filter plates of the present invention connected together in a filter press arrangement;

FIG. 2 is a perspective view of one of the filter plates of the present invention;

FIG. 3 is an enlarged fragmentary elevational view of a portion of the filter plate of FIG. 2 and showing the convoluted surface thereof;

FIG. 4 is a fragmentary vertical sectional view taken along line 4—4 of FIG. 2;

FIG. 5 is an enlarged fragmentary vertical sectional view, somewhat similar to FIG. 4, and showing the expansion of the skins forming part of a filter plate;

FIG. 6 is a fragmentary schematic side elevational view showing the operation of a plurality of filter plates constructed in accordance with the present invention and in a filter press arrangement;

FIG. 7 is an exploded perspective view showing the attachment of a filter screen to a filter plate in accordance with the present invention;

FIG. 8 is a side elevational view of the filter plate and filter screen arrangement;

FIG. 9 is an enlarged fragmentary sectional view showing the attachment of the filter screen to a filter plate in accordance with the present invention;

FIG. 10 is a perspective view of one form of retaining adapter used in accordance with the present invention;

FIG. 11 is a perspective view of a filter screen constructed in accordance with and embodying the present invention;

FIG. 12 is a vertical sectional view taken along line 12—12 of FIG. 11; and

Figure 13:
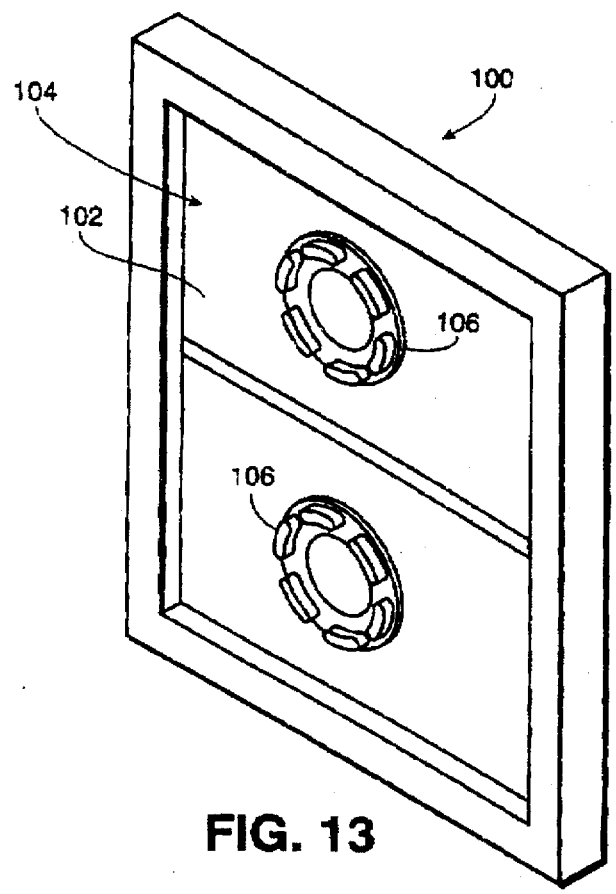

FIG. 13 is a perspective view of a modified form of filter plate construction in accordance with the present invention;

DETAILED DESCRIPTION OF PREFERRED EMBODIMENTS

Referring now in more detail and by reference characters to the drawings which illustrate several practical embodiments of the present invention, P designates a filter press arrangement comprised of a plurality of stacked and marginally registered filter plates 20 and which are captured between and held in pressed engagement with one another by means of metal end blocks 22. The end plates 22, and often referred to as "press plates", are forced toward one another and thereby clamp the filter plates 20 into tight engagement with one another by means of external force-applying devices, not shown, but operating upon shafts 24. The shafts 24 are typically part of a hydraulic ram, or other form of pneumatic ram, which forces the end plates 22 toward one another. However, other means of providing a clamping force between the two end plates 22, such as, for example, rotatable screw shafts or the like could be used.

In the embodiment of the invention as shown in FIG. 1, a pair of inlet feeds 26 are shown in one of the end plates 22 and respectively receive slurry delivery tubes 28. These delivery tubes 28 are connected to a source of a slurry containing solids entrained in or carried by a liquid and which are introduced to the respective plates, in a manner as hereinafter described in more detail. Moreover, each of the filter plates are provided with liquid drainage channels (also hereinafter described in more detail) which are connected to individual liquid extraction or drainage tubes 30, in turn, connected to a common drainage or recaptured liquid duct 32.

FIGS. 2–4 illustrate one form of filter plate 34 which is constructed in accordance with the present invention and is preferably molded such as, for example, by injection molding, from a suitable plastic, e.g., polypropylene, or the like. The plates, however, could be formed of any of a known number of moldable plastics, such as high density polyethylene, polybutadyene, etc. For that matter, the plates could be formed of other materials such as, for example, structural metals or the like.

Each filter plate 34 is comprised of a peripherally extending rectangularly shaped frame 36 which is preferably rectangular in shape. The central portion of the frame 36, that is, the portion surrounded by the frame 36, would otherwise be opened, except for a pair of integrally formed skins 38 which extend across the frame, as best shown in FIGS. 2–4 of the drawings. As shown in FIG. 4, each of the skins 38 are integral with the frame 36. This results from the fact that the entire filter plate is molded as an integral structure. However, it should be understood that the skins could be individually formed apart from the frame and thereafter attached to the frame. However, the integral construction of the skins and the frame is preferred, due to the added integrity and rigidness of the structural connection between the skins and the frame.

Each of the skins 38 are undulating and have individual ridges 40 separated by grooves or channels 42. Moreover, and by reference to FIG. 3, it can be seen, in a preferred embodiment of the invention, that the ridges and channels are also located in rectangular arrays, such that there is a series of progressively smaller rectangular grooves and channels emanating at the frame and extending toward the center of the skins.

The undulating surface of the skins 38 effectively allows the skins to expand and contract. While the skins themselves do not have any substantial elasticity, and indeed, have a relatively low modulus of elasticity, the skins nevertheless permit expansion and contraction through the undulating surface. In effect, this undulating surface provides an accordion-type effect so that the channels 42 and the ridges 40 actually become spaced apart from one another by greater dimensions during the expansion of the skins. However, due to the fact that the skins are molded, they have sufficient elasticity to return to their original shape when no longer forced into an expanded condition. The undulating surface also allows a greater filtration surface area.

The filter plate is also formed with a central opening 44 for entry of a slurry or sludge into individual cavities formed between the filter plates, as hereinafter described. The slurry which is to be filtered contains one or more solids and one or more liquids. As indicated previously, the one or more liquids may be retained and recycled for use in other processes. Otherwise, the solids may be reclaimed and reused or, for that matter, both may be reclaimed and reused. In many cases, the slurry may consist entirely of waste products but which are filtered to allow the solids to be discarded in a compact fashion and which allows the liquids to be subjected to waste treatment processes.

In order to permit drainage of the liquid separated from the solids, each filter plate is provided with shallow depressions 46 in the nature of drainage depressions. Moreover, each of these drainage depressions 46 communicate with diagonally located drainage channels 48 which are, in turn, connected to drainage openings 50 in the frame 36. Each of these drainage openings 50 are connected to the individual tubes 30 and for delivery of the separated liquids along the delivery duct 32. For this purpose, each drainage opening 50 may open on the side of the frame and may also be provided with a fitting (not shown) for connection to a discharge tube 30.

The filter plate 20 is hollow, as previously described and as best shown in FIGS. 4 and 5 of the drawings. Thus, the peripherally extending frame has an inner peripheral space 52 and the skins 38 have an internal space 54 in communication therewith. These entire spaces 52 and 54 are filled with a plastic foam core material such as, for example, a polyurethane foam 56. However, the space 52 and the communicating space 54 between the skins 38 is all sealed, since the entire frame itself remains effectively sealed. Thus, an expanding fluid can be introduced into the foam core 56 causing expansion of the skins from the position, as shown in FIG. 4, to the expanded condition, as shown in FIG. 5. This feature aids in filter efficiency, as hereinafter described.

In order to introduce an expanding fluid into the foam core 56, the frame 36 is provided with one or more fittings 58. These fittings are designed for connection to a source of an expanding fluid for introduction into the foam core 56. In this respect, the term "expanding fluid" refers to a fluid which will cause expanding of the skins 38 and does not necessarily refer to the fact that the fluid itself is expandable or contractable. In many cases, the expanding fluid could be a hydraulic fluid, although in a more preferred embodiment, for ease and cost control, air under pressure serves as an excellent expanding fluid.

Each filter plate is also provided with one or more filter screen-receiving openings 60. In the embodiment of the invention, as shown in FIGS. 2–4, four rectangularly arranged filter-receiving openings 60 are provided and each opening is surrounded by a rectangularly shaped step 62. Thus, in the embodiment, as shown, the filter plate 20 would be provided with four individual filter screens, as hereinafter described in more detail. The actual attachment of the filter screen to the filter plate is also hereinafter described in more detail. However, it should be understood that one single filter screen could be located on the exterior side of each of the skins and mounted through the feed opening 44.

Each of the individual filter plates 20 have the skins recessed inwardly with respect to the sides of the frame, as best shown in FIGS. 2 and 4 of the drawings. In effect, there is an enlarged recess existing between the exterior face of the skin and the sides of the peripheral frame 36. When a plurality of like filter plates are connected together, as best shown in FIG. 6 of the drawings, these individual recesses form liquid-receiving cavities 66. In the embodiment as shown in FIG. 6, the slurry feed inlet opening 44 is located at the center of each of the filter plates. This slurry feed opening extends, in effect, through each of the individual filter plates and is in communication with the cavity formed by the spaced-apart and opposed recesses on each of a pair of connected filter plates 20. It can also be seen, in accordance with the arrangement as shown in FIG. 6 that drainage openings 50 communicate with a common drainage duct 68 formed in each of the individual filter plates and which would in turn, lead to a single drainage tube 30 and the discharge duct 32.

By further reference to FIG. 6, it can also be seen that each of the individual filter plates 20 carry filter screens, as also hereinafter described in more detail. These filter screens are also constructed to permit delivery, e.g., pumping of the liquid and solid containing slurry into the individual cavities 66. During the separation process, the liquid is allowed to seep through the filter screen into the recess associated with each individual filter plate and into the drainage duct 68. The solids, on the other hand, will remain as a cake on the exterior surface of each of the filter screens, as hereinafter described.

One of the unique aspects of the filter plate, as heretofore described, is the fact that it can be formed of a moldable plastic. This permits heat transfer to take place, both easily and inexpensively and moreover, on an efficient heat transfer basis. In many cases, it is desirable, if not necessary, to maintain the slurry at a certain temperature in order to maintain one of the components of the slurry in a desired condition for further processing or otherwise, to facilitate liquid-solid separation.

Due to the fact that the skins are very tightly adhered to and are indeed preferably integral with the frame, there is little risk of "blowing" the skins, that is causing a separation of the skins from the frame. Moreover, due to the fact that all components are formed of the same plastic material, heat transfer can be easily effectuated by introducing a fluid into the solid core which will readily and quickly either heat or cool the slurry which is being separated. Furthermore, electric probe heaters may also be inserted into the core in order to effectuate heat transfer.

In the case of the conventional diaphragm type filter plate, heat transfer was very inefficient and not easily controllable, due to the fact that the diaphragm plates are formed of elastomeric materials. However, the filter plates of the present invention do not suffer these disadvantages. Indeed, the filter plates can be constructed as a unitary structure in a conventional molding operation and therefore, not only are the filter plates more efficient, but they are far less expensive to produce. In addition, the inherent risk of destroying the filter plate by causing expansion when not in a press arrangement is also avoided.

The fact that the filter plates are also constructed of a relatively inert and fully polymerized plastic material enables a chemical resistivity which is sometimes not available with many elastomers. Furthermore, and due to the fact that temperature control can be maintained, it is also possible to impose a vacuum on the slurry introduced in the cavities between the filter plates in order to thereby further effectuate liquid-solid separation. When the slurry is placed under strong vacuum, it is possible to reduce the temperature in order to effectuate liquid-solid separation. Imposing of a vacuum also permits drying the cake much more quickly. As the cake dries, the cake forms as a solid structure and does not flake, as such.

Due to the fact that the plate skins are undulating and even preferably, have a somewhat serpentine shape, drainage area is substantially increased. Moreover, filtration surface is further increased by as much as 40%. The filter plates can also be constructed in a variety of sizes and shapes. Thus, for example, the filter plate could be constructed in a relatively small size for use in laboratory environments to sizes ranging to a very large filter plate used in large industrial operations.

The present invention allows a so-called "unblinding" of the filter cake. When the cake becomes compressed against the filter screen, it begins to impede liquid flow therethrough. The liquid flow is decreased proportionately to the increase in thickness of the cake and the density of the cake. Consequently, when the cake becomes too thick, the slurry cannot reach the filter cloth. By temporarily releasing the individual plates in the press, the cakes become released from the screens. This allows a slight space between the cake and the screen so that when the plates are again retightened, additional slurry can literally reach the screen by travelling around the edges of the cake and thereby allow filtration to continue. Thus, the filter cake is actually built up from the inside portion facing the screen.

FIGS. 7–12 of the drawings more fully illustrate a preferred embodiment of a filter screen device forming part of the present invention and which may be used with the filter plates heretofore described. The filter screen device 70 comprises an individual screen frame or screen base 72. By reference to FIGS. 7, 8 and 11 of the drawings, it can be seen that the screen frame 72 is rectangularly shaped and would otherwise be formed with a central opening existing between the peripherally extending rectangularly shaped screen frame 72. However, a filter cloth or so-called "filter screen" 74 is incorporated in that existing initially opened space.

The filter screen 74 is actually formed of any of those materials used as filter screens in prior art devices. Thus, any cloth which is relatively chemically inert and capable of permitting separation of liquids from a solid by permitting passage of the liquid and collection of the solid as a cake, can be used. These devices typically will employ a filter cloth which is frequently referred to in the art as a "filter screen." Therefore, the term "filter screen" is used in a broad sense to encompass any type of filter material, whether referred to as a gauze, cloth or screen.

The filter screen frame 72 is preferably, although not necessarily, formed of an elastomeric material. Thus, and to some extent, the filter screen frame 72 will have some resiliency and elasticity. The filter screen 74 is actually molded into the filter screen frame 72, so as to form a unitary structure. In this case, the filter screen 74 thereby becomes effectively integral into the filter screen frame 72. FIG. 12 illustrates the filter screen or cloth 74 molded as an integral structure into the filter screen frame 72. It can be seen that the filter screen frame 72 is provided with inner peripherally extending flanges 76 and 78 which are, in effect, molded to one another directly through the pores of the filter screen or cloth 74. Thus, the filter screen 74 actually becomes an integral part of the filter screen device 70.

The filter screen 74 is also provided with a central opening 80 capable of being aligned with the feed opening 44 in the filter plate. This will allow feed slurry to be passed through the filter screen 74 to the exterior side thereof and will allow the liquid to separate from the solids directly through the pores of the screen 74. Each filter screen frame 72 is also provided with drainage openings 82 which are alignable with and in communication with the drainage openings 50 in the respective filter plates.

The fact that the filter screen 74 is molded into the frame 72 enables a relatively trouble-free operation. Moreover, this type of filter screen device is much easier to clean than a conventional O-ring type filter. This type of filter screen device 70 allows solids to be retained by the filter screen 74 in operation and as more solids are pumped into the cavities, liquid is displaced through the filter screen 70 and cakes are formed. When all cavities have been filled with the cake, the assembly is opened and the cakes are removed from each individual plate. After the cake has been removed, the same filter screen can be reused with the plates pressed back together and the entire press closed to repeat the cycle.

Each filter screen 70 is retained on an individual filter plate 20 by means of a retaining adapter 86 which is more fully illustrated in FIGS. 9 and 10 of the drawings. In the embodiment of the invention as shown, the retaining adapter 86 is provided with a cylindrically shaped retaining flange 88 having a size larger than the feed opening 80 of the filter screen and is adapted to overly a portion of the filter screen 74 to retentively hold the filter device 70 onto the filter plate 20. The retaining flange 88 is integrally provided with a cylindrically shaped hub 90 having a central opening 92 in order to allow the feed slurry to pass through the aligned feed aperture 80 in the filter screen 74 and into the feed aperture 74 in the filter plate 20. This will allow the individual introduced feed slurry streams to be introduced into the individual cavities 66.

The adapters 86 are provided on the exterior face with their enlarged fastener-receiving bosses 94 having fastener-receiving openings 96. This will allow receipt of a mechanical fastener such as screws or the like for securement of two retaining adapters 86 on each of the opposite sides of the filter plate, as best shown in FIGS. 8 and 9 of the drawings.

The retaining adapter 86 is preferably formed in a plastic molding operation and may also be formed of any of those plastics used in the formation of the filter plate 36. The hubs 90 of the adapters 86 are sized to be received in the individual feed apertures, such as the feed aperture 80 and the feed aperture 44. However, and again, when recognizing that the plates can be constructed of various sizes, the hubs 90 and hence the feed openings 92 of the retaining adapters would be constructed with the appropriate size.

Each of the filter screens are also provided on the filter screen 74 with fastener-receiving openings 98. In this way, these fastener receiving openings 98 are alignable with the fastener-receiving openings 96 in the bosses 94 to receive the individual fasteners.

FIG. 13 illustrates an embodiment of a filter plate 100 having a pair of feed openings 102. In this case, an individual filter assembly 104, substantially similar to the filter assembly 70, is located on the filter plate and a second filter screen or filter assembly 106 covers the remainder of the first side of the filter plate. A pair of like filter assemblies are on the opposite side of the filter plate. Each filter screen assembly has an adapter which fits in a feed aperture of the filter plate and the screens on each side of the plates substantially cover the exposed surface area of the individual skins of the filter plate. Each filter screen assembly 104 is provided with a retaining adapter 106, substantially similar in construction to the retaining adapter 86. In accordance with the construction as shown in FIG. 13, it is therefore possible to use a pair of filter screens with a pair of simultaneously operating feed inlets.

The filter screen assembly of the present invention allows the filter screen to be not only reusable, as aforesaid, but also allows the filter screen to be readily and easily cleaned. It has a much greater structural integrity than does a typical filter cloth which is frequently discarded after use. The filter screen assembly of the present invention also has considerably greater durability and much more structural integrity than does a standard filter cloth. Moreover, the fact that the filter screen assemblies can be effectively clamped at the feed inlets without having to extend through the feed inlets, allows a plurality of inlets in each individual filter plate. This was not effectively possible on an efficient basis with prior art filter plate and filter screen constructions.

The filter screen assembly of the invention is therefore far more efficient and effective then the prior art so-called "weep cloth." In effect, there is a one-piece gasket type arrangement which is obtained with the filter screen assembly of the invention. Further, it is not necessarily to sew or secure two cloths together so as to have a separate cloth on each side of the filter plate. Further, it is not necessary to effectively thread the filter cloth through the filter plate.

Thus, there has been illustrated and described a unique filter plate construction and a filter screen assembly arrangement which enables liquid-solid separation on a highly efficient basis and which therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A filter plate for use in a filter press to effect liquid-solid separation from a slurry, said filter plate comprising:
   a) a main peripherally extending continuous plastic molded frame having a hollow interior, said hollow interior being defined by a pair of parallel walls forming a pair of substantially planar peripheral sealing surfaces on opposite sides of said frame, and a peripheral edge wall joined to outer peripheral edges of said parallel walls for defining an imperforate peripheral edge of said filter plate;
   b) a pair of spaced-apart plastic skins respectively joined to inner peripheries of said pair of parallel walls and extending entirely across said frame and forming an interior space therebetween in communication with the interior of said frame, wherein each said skin includes an outer surface portion which is recessed inwardly toward a central plane of said plate with respect to an adjacent said sealing surface;
   c) a plastic foam core located in and substantially filling the hollow interior of said frame and the interior space between the skins and which permits expansion of the skins when a fluid is introduced into said foam core in said hollow interior and the interior space between the skins to thereby impose an additional pressure against the slurry and facilitate liquid-solid separation;
   d) tubular fitting means extending through the peripheral edge wall of said frame and terminating at an open end proximate an interior surface of said peripheral edge wall and within the hollow interior of said frame to enable introduction of a fluid into the foam core in the hollow interior of the frame and the interior space between the skins;
   e) drainage duct means disposed in said frame for defining a drainage duct, wherein said drainage duct extends through said sealing surfaces and said hollow interior and communicates with the recessed outer surface portions of said skins via drainage openings;
   f) slurry inlet means extending through said pair of skins and said interior space for defining a slurry inlet opening; and,
   g) wherein said frame, skins, tubular fitting, drainage duct means, and slurry inlet means together constitute a single unitary structure formed of a plastic selected from the group consisting of polypropylene, high density polyethylene, and polybutadyene.

2. The filter plate of claim 1 wherein said skins have a convoluted surface to facilitate expansion of the skins.

3. The filter plate of claim 2 wherein said skins have liquid drainage channels formed formed in the outer surface portion of said skins to permit drainage of liquid separated from the slurry.

* * * * *